United States Patent
Hashimoto

(10) Patent No.: US 10,996,837 B2
(45) Date of Patent: May 4, 2021

(54) ELECTRONIC APPARATUS AND METHOD FOR CONTROLLING ELECTRONIC APPARATUS

(71) Applicant: SEIKO EPSON CORPORATION, Tokyo (JP)

(72) Inventor: Hiroyuki Hashimoto, Suwa-gun (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/139,191

(22) Filed: Sep. 24, 2018

(65) Prior Publication Data
US 2019/0095089 A1    Mar. 28, 2019

(30) Foreign Application Priority Data
Sep. 25, 2017 (JP) ............................... JP2017-183295

(51) Int. Cl.
| | |
|---|---|
| *G06F 3/048* | (2013.01) |
| *G06F 3/0484* | (2013.01) |
| *G03B 21/14* | (2006.01) |
| *G06F 3/0487* | (2013.01) |
| *G06F 3/038* | (2013.01) |
| *G06F 13/10* | (2006.01) |

(52) U.S. Cl.
CPC ......... *G06F 3/04847* (2013.01); *G03B 21/14* (2013.01); *G06F 3/038* (2013.01); *G06F 3/0487* (2013.01); *G06F 13/102* (2013.01)

(58) Field of Classification Search
CPC ...... G06F 3/048; G06F 3/04847; G06F 3/038; G06F 3/0487; G03B 21/14
See application file for complete search history.

(56) References Cited

U.S. PATENT DOCUMENTS

| | | | |
|---|---|---|---|
| 5,807,175 A * | 9/1998 | Davis | ...................... A63F 13/06 |
| | | | 463/36 |
| 2008/0037050 A1 | 2/2008 | Sasaki | |
| 2011/0222118 A1* | 9/2011 | Mukaiyama | .......... G06F 3/1284 |
| | | | 358/1.15 |
| 2012/0200878 A1 | 8/2012 | Sasaki | |

(Continued)

FOREIGN PATENT DOCUMENTS

| | | |
|---|---|---|
| JP | 2008-048048 A | 2/2008 |
| JP | 2008-287453 A | 11/2008 |

(Continued)

*Primary Examiner* — Xuyang Xia
(74) *Attorney, Agent, or Firm* — Oliff PLC

(57) ABSTRACT

An electronic apparatus connectable with an external apparatus includes: a communication unit which communicates with the external apparatus; an interface where a plurality of devices can be connected; and a control unit which controls plug and play for a device connected to the interface. The control unit does not cause the external apparatus to execute plug and play accompanying the connection between the electronic apparatus and the external apparatus when a first device is connected to the interface, the first device is not a specific type. The control unit causes the external apparatus to execute plug and play accompanying the connection between the electronic apparatus and the external apparatus when a second device is connected to the interface, the second device is the specific type.

8 Claims, 5 Drawing Sheets

(56) References Cited

U.S. PATENT DOCUMENTS

| | | | |
|---|---|---|---|
| 2014/0019651 A1* | 1/2014 | Ben-Harosh | G06F 9/4413 710/63 |
| 2014/0210693 A1 | 7/2014 | Bhamidipati et al. | |
| 2015/0263905 A1* | 9/2015 | Beel | G06F 3/04842 715/753 |

FOREIGN PATENT DOCUMENTS

| | | |
|---|---|---|
| JP | 2014-510961 A | 5/2014 |
| JP | 2015-032939 A | 2/2015 |
| JP | 2015-176536 A | 10/2015 |
| JP | 2016-511965 A | 4/2016 |
| JP | 2017-068001 A | 4/2017 |
| WO | 2012/100193 A1 | 7/2012 |

\* cited by examiner

ELECTRONIC APPARATUS AND METHOD FOR CONTROLLING ELECTRONIC APPARATUS

BACKGROUND

1. Technical Field

The present invention relates to an electronic apparatus and a method for controlling an electronic apparatus.

2. Related Art

JP-A-2015-176536 discloses a system which includes a projector and a terminal device such as a personal computer. In this system, first, the projector and the terminal device are wirelessly connected to each other. Then, image information is transmitted from the terminal device to the projector.

The widespread use of USB (universal serial bus) or the like has enabled various devices to be connected to an electronic apparatus such as the projector described in JP-A-2015-176536. In such circumstances, it is more convenient if the terminal device such as a personal computer can communicate with the device connected to the projector (electronic apparatus) connected with the terminal device.

Incidentally, many USB devices or the like are compatible with the plug and play function. Therefore, when a plurality of devices are connected to an electronic apparatus and the electronic apparatus is connected to a terminal device, the processing load of the terminal device increases if the terminal device executes the plug and play function for the plurality of devices regardless of the types of the plurality of devices.

SUMMARY

An advantage of some aspects of the invention is that when a device is connected to an electronic apparatus and the electronic apparatus is connected to an external apparatus such as a terminal device, increase in the processing load of the external apparatus can be restrained.

An electronic apparatus according to an aspect of the invention is connectable with an external apparatus and includes: a communication unit which communicates with the external apparatus; an interface where a plurality of devices can be connected; and a control unit which controls plug and play for a device connected to the interface. The control unit does not cause the external apparatus to execute plug and play accompanying the connection between the electronic apparatus and the external apparatus when a first device is connected to the interface, the first device is not a specific type. The control unit causes the external apparatus to execute plug and play accompanying the connection between the electronic apparatus and the external apparatus when a second device is connected to the interface, the second device is the specific type.

According to the aspect of the invention, the external apparatus does not execute plug and play accompanying the connection between the electronic apparatus and the external apparatus when a first device is connected to the interface, the first device is not a specific type. This can restrain increase in the processing load of the external apparatus when the device is connected to the electronic apparatus and the electronic apparatus is connected to the external apparatus.

In the electronic apparatus according to the aspect of the invention, it is desirable that the control unit transmits first device information about the first device to the external apparatus according to the connection between the electronic apparatus and the external apparatus.

The aspect of the invention with this configuration enables the external apparatus to recognize that the first device is connected to the electronic apparatus.

In the electronic apparatus according to the aspect of the invention, it is desirable that the control unit transmits virtual storage information about a virtual storage which stores the first device information, to the external apparatus according to the connection between the electronic apparatus and the external apparatus.

The aspect of the invention with this configuration enables the external apparatus to recognize the first device connected to the electronic apparatus, as an element stored in the virtual storage device.

In the electronic apparatus according to the aspect of the invention, it is desirable that the control unit causes the external apparatus to execute plug and play for the first device if the control unit receives a connection instruction which designates connection with the first device, from the external apparatus.

According to the aspect of the invention with this configuration, for example, transmitting a connection instruction from the external apparatus to the electronic apparatus according an operation by the user of the external apparatus causes the external apparatus to execute plug and play for the first device connected to the electronic apparatus. This enables the first device connected to the electronic apparatus to be connected to the external apparatus.

In the electronic apparatus according to the aspect of the invention, it is desirable that the electronic apparatus further includes a display unit which displays, on a display surface, an operation screen where an operation input is made to the effect that the first device is connected to the external apparatus, and that the control unit causes the external apparatus to execute plug and play for the first device according to the operation input on the operation screen.

According to the aspect of the invention with this configuration, for example, an operation input on the operation screen of the electronic apparatus by the user of the electronic apparatus causes the external apparatus to execute plug and play for the first device connected to the electronic apparatus. This enables the first device connected to the electronic apparatus to be connected to the external apparatus.

In the electronic apparatus according to the aspect of the invention, it is desirable that the control unit transmits connection information that the second device is connected to the interface, to the external apparatus according to the connection between the electronic apparatus and the external apparatus, and thus causes the external apparatus to execute plug and play for the second device accompanying the connection between the electronic apparatus and the external apparatus.

The aspect of the invention with this configuration makes it possible to cause the external apparatus to execute plug and play for the second device of a specific type when the electronic apparatus transmits connection information to the external apparatus.

In the electronic apparatus according to the aspect of the invention, it is desirable that the second device is a pointing device.

A PC (personal computer) or a similar apparatus is likely to be equipped with a driver for driving a pointing device.

According to the aspect of the invention with this configuration, the external apparatus is made to execute plug and play accompanying the connection between the electronic apparatus and the external apparatus, for the pointing device for which the external apparatus is likely to have a driver. Thus, in this plug and play, the external apparatus is unlikely to newly acquire a driver for the pointing device and therefore the load of the external apparatus can be restrained.

An electronic apparatus according to another aspect of the invention is connectable with an external apparatus and includes: a communication unit which communicates with the external apparatus; an interface where a device can be connected; and a control unit which controls plug and play for a device connected to the interface. The control unit does not cause the external apparatus to execute plug and play accompanying the connection between the electronic apparatus and the external apparatus when a first device is connected to the interface, the first device is not a specific type. The control unit causes the external apparatus to execute plug and play for the first device when the control unit receives a connection instruction which designates connection with the first device, from the external apparatus.

According to the aspect of the invention, the external apparatus does not execute plug and play accompanying the connection between the electronic apparatus and the external apparatus when a first device is connected to the interface, the first device is not a specific type. This can restrain increase in the processing load of the external apparatus when the device is connected to the electronic apparatus and the electronic apparatus is connected to the external apparatus. Also, the first device connected to the electronic apparatus can be connected to the external apparatus in response to a connection instruction.

A method for controlling an electronic apparatus according to another aspect of the invention is a method for controlling an electronic apparatus connectable with an external apparatus and including a communication unit which communicates with the external apparatus and an interface where a plurality of devices can be connected. The method includes not causing the external apparatus to execute plug and play accompanying the connection between the electronic apparatus and the external apparatus when a first device is connected to the interface, the first device is not a specific type; and causing the external apparatus to execute plug and play accompanying the connection between the electronic apparatus and the external apparatus when a second device is connected to the interface, the second device is the specific type.

According to the aspect of the invention, the external apparatus does not execute plug and play accompanying the connection between the electronic apparatus and the external apparatus when a first device is connected to the interface, the first device is not a specific type. This can restrain increase in the processing load of the external apparatus when the device is connected to the electronic apparatus and the electronic apparatus is connected to the external apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
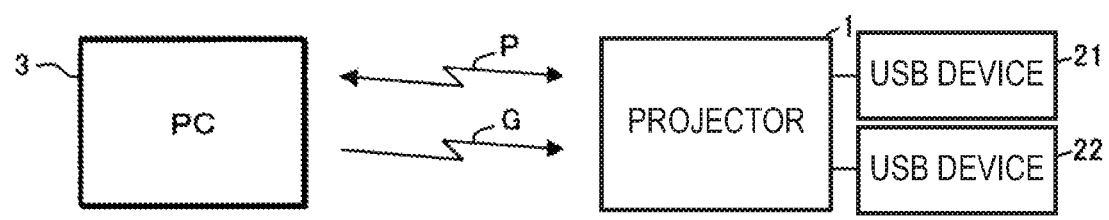
FIG. 1 shows a projector 1 according to a first embodiment.

Hereinafter, an embodiment of the invention will be described with reference to the drawings. In the drawings, the dimension and scale of each part are different from the actual dimension and scale, where appropriate. The embodiment described below is a preferable specific example of the invention. Therefore, the embodiment includes various details that are technically preferable. However, the embodiment should not limit the scope of the invention unless the description below particularly states that the invention should be limited.

First Embodiment

FIG. 1 shows a projector 1 according to a first embodiment.

The projector 1 is an example of an electronic apparatus and a display device. USB devices 21 and 22 are connected to the projector 1.

The USB device 21 is a USB device not belonging to the HID (human interface devices) class. In this embodiment, the USB device 21 is a camera device. The HID class is an example of a specific type. The USB device 21 is an example of a first device that is not a specific type.

The USB device 22 is a device belonging to the HID class. In this embodiment, the USB device 22 is a pointing device such as a pen used to draw a line or the like, based on an interactive drawing function provided in the projector 1. The USB device 22 is an example of a second device of a specific type.

The projector 1 belongs to a network to which a PC (personal computer) 3 belongs. The projector 1 can wirelessly connect to the PC 3.

The USB devices 21 and 22 connected to the projector 1 can be connected directly to the PC 3. However, for example, if the projector 1 and the PC 3 are physically distant from each other and the user is present on the projector 1 side, it is not desirable to connect the USB devices 21 and 22 directly to the PC 3 in view of preventing the USB devices 21 and 22 from being stolen or the like.

Thus, in this embodiment, the projector controls the communication between the USB devices 21 and 22 and the PC 3 so that the PC 3 can manage even the USB devices 21 and 22 connected to the projector 1.

The projector 1 executes wireless connection with the PC 3 and communication of image information with the PC 3 in conformity with the Miracast (trademark registered) standard. According to the Miracast standard, P2P (peer to peer) connection is used to connect apparatuses to each other. According to the Miracast standard, RTSP (Real Time Streaming Protocol) is used for controlling the transmission of image information and RTP (Real Time Transport Protocol) is, used for the actual transmission of image information.

To restrain increase in the processing load of the PC 3 accompanying the connection between the PC 3 and the projector 1, the projector 1 does not connect the USB device 21 to the PC 3 but connects the USB device 22 to the PC 3, when connected with the PC 3 via P2P.

For example, the projector 1 does not transmit, to the PC 3, first connection information that the USB device 21 is connected to a USB hub 154 (see FIG. 2), described later, but the projector 1 transmits to the PC 3 second connection information that the USB device 22 is connected to the USB hub 154.

In this case, the PC 3 does not execute plug and play for the USB device 21 but executes plug and play for the USB device 22.

Since the PC 3 does not execute plug and play for the USB device 21, the processing load of the PC 3 can be restrained, compared with when this plug and play is executed.

Also, as the PC 3 executes plug and play for the USB device 22, the PC 3 is connected (USB-connected) to the USB device 22.

The USB device 21, which is not connected (USB-connected) to the PC 3 in the connection between the projector 1 and the PC 3, becomes connected to the PC 3 when necessary.

When the projector 1 receives a first connection instruction that the USB device 21 should be connected to the PC 3, the projector 1 transmits the first connection information to the PC 3, causes the PC 3 to execute plug and play for the USB device 21, and thus causes the PC 3 and the USB device 21 to be connected (USB-connected) to each other.

The projector 1 controls the communication between the USB device 21 and the PC 3, using the IP (internet protocol) technology.

Specifically, the projector 1 encapsulates transmission information transmitted from the USB device 21 into an IP packet, thus generates a transmission packet, and transmits the generated transmission packet to the PC 3. The projector 1 decapsulates an IP packet received from the PC 3, thus generates reception information, and output the generated reception information to the USB device 21. Hereinafter, the technique of encapsulating transmission information into an IP packet to generate transmission information and decapsulating an IP packet to generate reception information is also referred to as "UoIP (USB over IP)". The projector 1 also uses UoIP for the communication between the USB device 22 and the PC 3.

When the PC 3 is connected with the projector 1 via P2P, the PC 3 transmits image information G to the projector 1 in conformity with the Miracast standard. The projector 1 can control the communication between the USB device 21 and the PC 3 and the communication between the USB device 22 and the PC 3, while executing the communication of the image information G with the PC 3.

In the example shown in FIG. 1, the projector 1 controls the communication of information P between the USB devices 21 and 22 and the PC 3, while receiving the image information G from the PC 3. The information P is an IP packet generated by UoIP. The image information G may be still image information or dynamic image information.

The projector 1 sets each of the USB devices 21 and 22 into one of a first state of being connected to the PC 3, a second state of being connected to the projector 1, and a third state of being connected to neither the PC 3 nor the projector 1. The projector 1 sets the connection state of each of the USB devices 21 and 22, for example, in response to an input from the user of the projector 1.

Figure 2:
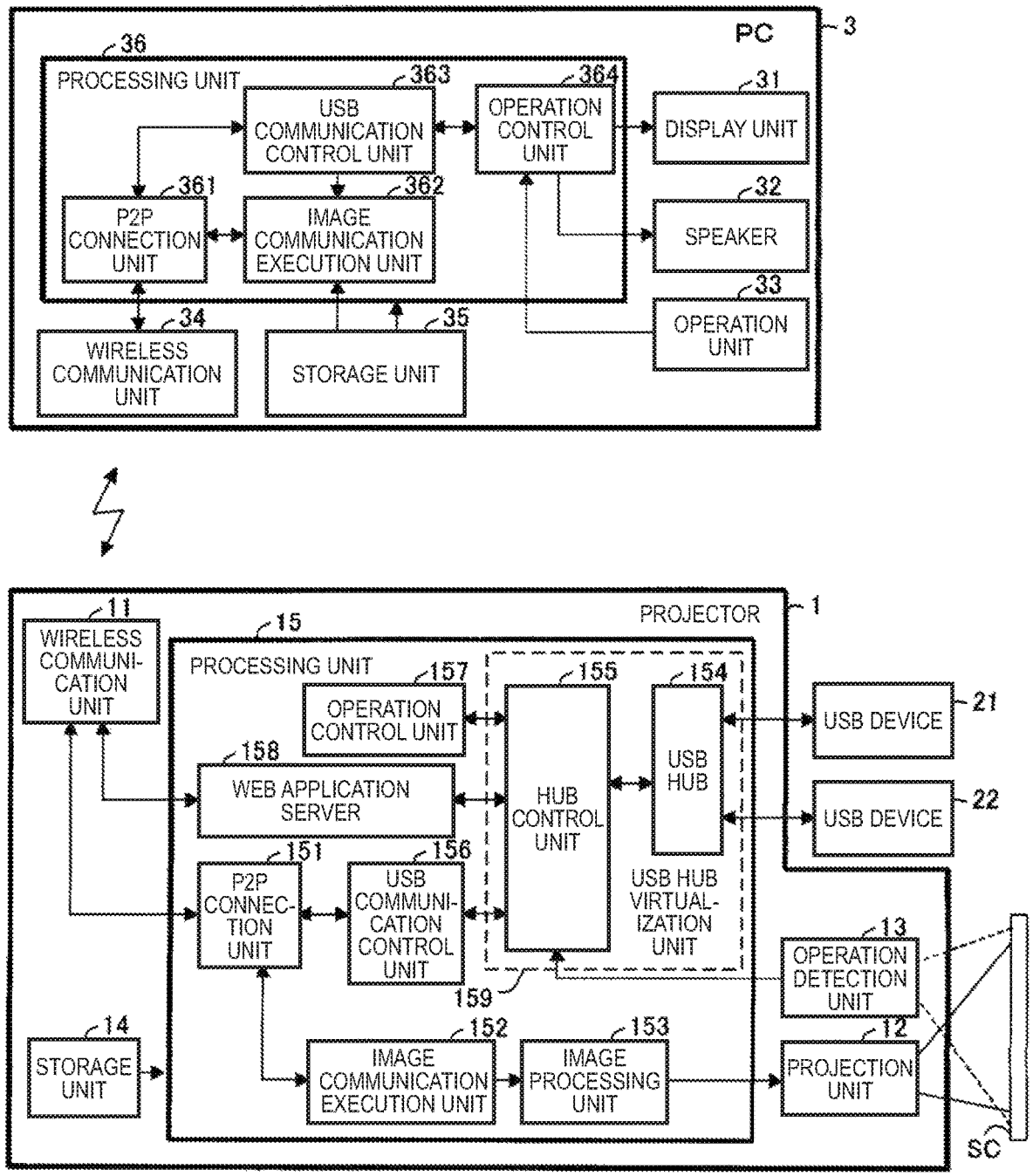
FIG. 2 shows an example of the projector 1 and a PC 3.

FIG. 2 shows an example of the projector 1 and the PC 3.

The projector 1 includes a wireless communication unit 11, a projection unit 12, an operation detection unit 13, a storage unit 14, and a processing unit 15.

The wireless communication unit 11, for example, wirelessly communicates with the PC 3. The wireless communication unit 11, for example, receives image information G from the PC 3 after wirelessly connecting to the PC 3. The wireless communication unit 11 also wirelessly communicates information exchanged between the PC 3 and the USB device 21 and information exchanged between the PC 3 and the USB device 22.

The projection unit 12 projects and displays an image corresponding to the image information G onto the projection surface SC such as a screen. The projection unit 12 is an example of a display unit. The projection surface SC is an example of a display surface. The display unit does not include the display surface such as the projection surface SC.

Figure 3:
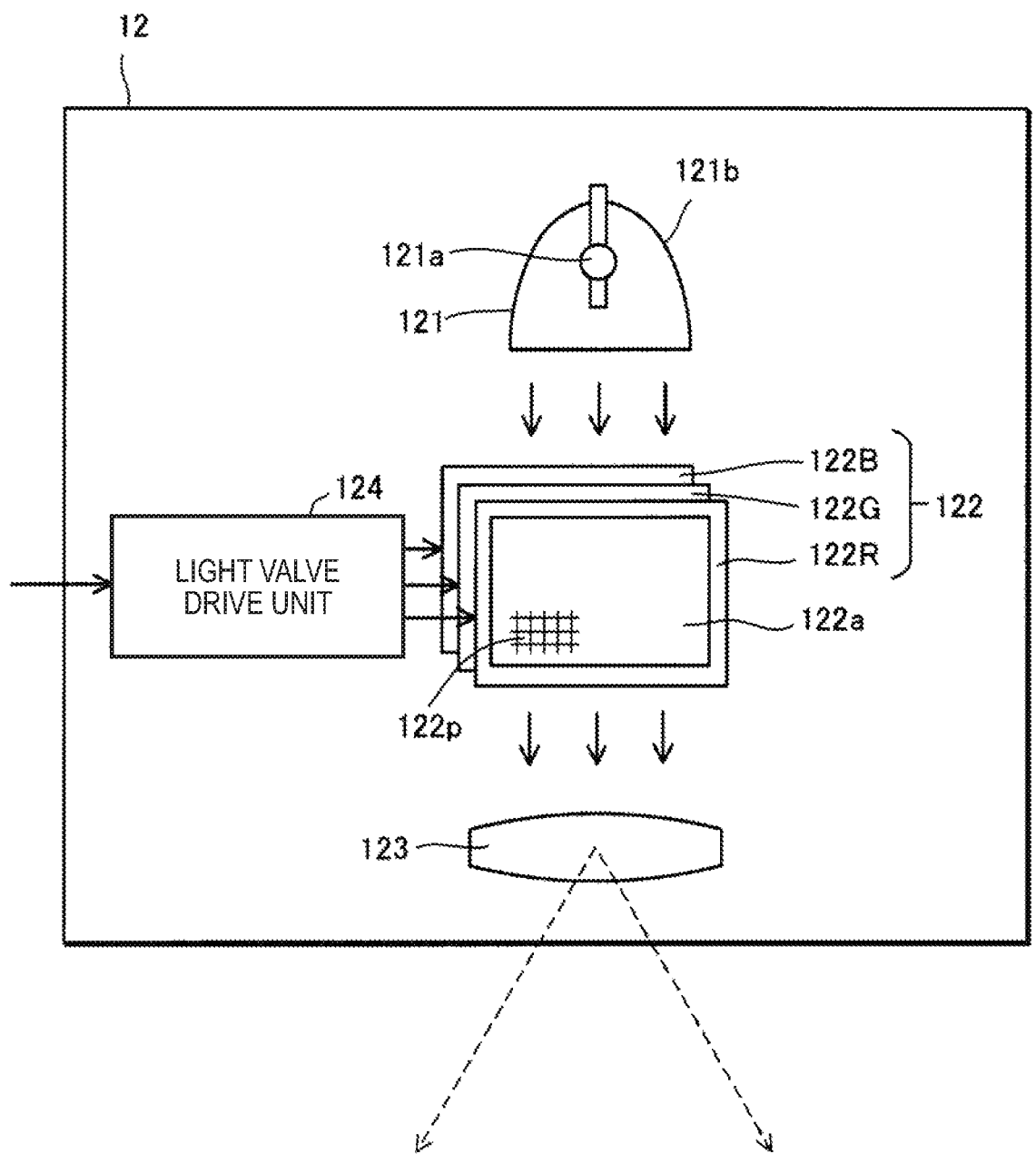
FIG. 3 shows an example of a projection unit 12.

FIG. 3 shows an example of the projection unit 12. The projection unit 12 includes a light source 121, three light valves 122 (122R, 122G, 122B) as an example of a light modulation device, a projection lens 123 as an example of a projection system, and a light valve drive unit 124 or the like. The projection unit 12 modulates, via the light valves 122, light emitted from the light source 121 and thus forms an image (image light), and projects this image in an enlarged manner through the projection lens 123. The image projected by the projection unit 12 may be generally referred to as "projection image".

The light source 121 includes a light source unit 121a made up of a xenon lamp, ultra-high-pressure mercury lamp, LED (light emitting diode), or laser light source or the like, and a reflector 121b which reduces variations in the direction of light radiated from the light source unit 121a. The light emitted from the light source 121 has its variation in luminance distribution reduced by an optical integration system, not illustrated, and is subsequently split into color light components of the primary colors of red (R), green (G), and blue (B) by a color separation system, not illustrated. The R, G, B color light components become incident on the corresponding liquid crystal light valves 122R, 122G, 122B.

Each of the light valves 122 is formed by a liquid crystal panel or the like made up of a pair of transparent substrates with liquid crystal enclosed between them. In the light valve 122, a rectangular pixel area 122a made up of a plurality of pixels 122p arranged in the form of a matrix is formed. In the light valve 122, a drive voltage can be applied to the liquid crystal for each pixel 122p. When the light valve drive unit 124 applies to each pixel 122p a drive voltage corresponding to an image signal inputted from the processing unit 15 (specifically, an image processing unit 153, described later), each pixel 122p is set to a light transmittance corresponding to the image signal. Therefore, the light emitted from the light source 121 is modulated by being transmitted through the pixel area 122a and thus forms an image corresponding to the image signal, for each color light component.

The images of the respective colors are combined for each pixel 122p by a light combining system, not illustrated. Projection image light (projection image) which is color image light (color image) is thus generated. The projection image light is projected in an enlarged manner on the display surface SC by the projection lens 123.

Figure 4:
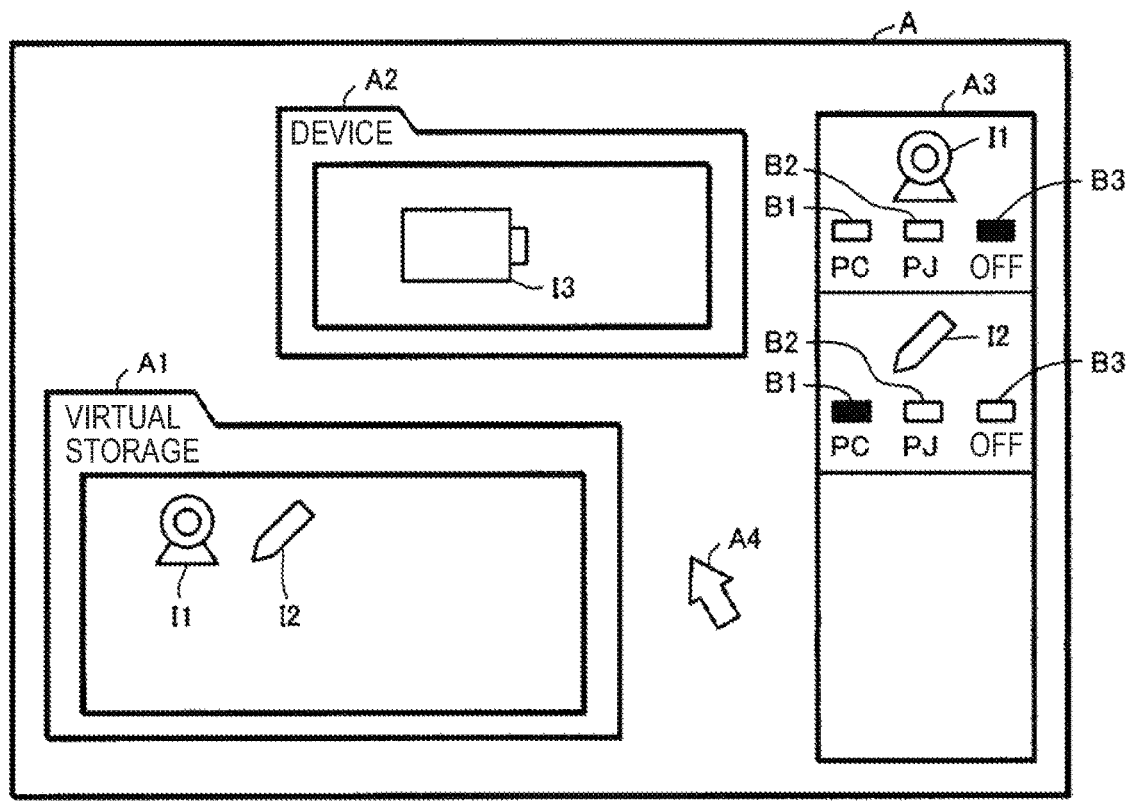
FIG. 4 shows an operation screen A.

FIG. 4 shows an operation screen (operation image) A which is an example of an imaged projected by the projection unit 12.

The operation screen A includes a virtual storage folder A1, a device folder A2, a connection setting image A3, and a cursor A4. The parts of the operation screen A except the connection setting image A3 are represented by the image information G provided from the PC 3. The connection setting image A3 is generated by the projector 1 as an OSD (on-screen display) image.

Therefore, the image of the parts of the operation screen A except the connection setting image A3 (image showing the virtual storage folder A1, the device folder A2, and the cursor A4) can also be displayed on the PC 3.

The projector 1 superimposes the connection setting image A3 on the image represented by the image information G and thus generates the operation screen A.

The virtual storage folder A1 shows the USB devices 21 and 22 connected to the projector 1 in the form of icons. An icon I1 corresponds to the USB device 21 (camera device). An icon I2 corresponds to the USB device 22 (pointing device).

Information about each of the USB devices 21 and 22 connected to the projector 1 (first device information about the USB device 21 and second device information about the USB device 22) is provided to the PC 3 from the projector 1.

It is desirable that the virtual storage folder A1 is displayed in such a way as to be distinguishable from a physical storage folder (not illustrated) (for example, color of the virtual storage folder A1 is different from that of the physical storage folder).

The device folder A2 shows, in the form of an icon, a device (hereinafter also referred to as "network device") existing on the network to which the PC 3 belongs. An icon I3 corresponds to the projector 1.

The connection setting image A3 is used to set each of the USB devices 21 and 22 connected to the projector 1 into one of the first state (state of being connected to the PC 3), the second state (state of being connected to the projector 1), and the third state (state of being connected to neither the PC 3 nor the projector 1).

The connection setting image A3 shows an icon for the USB device and three checkboxes B1 to B3, for each of the USB devices 21 and 22 connected to the projector 1. The checkbox B1 corresponds to the PC 3. The checkbox B2 corresponds to the projector 1. The checkbox B3 corresponds to off-state.

In the state shown in FIG. 4, of the checkboxes B1 to B3 for the USB device 21, the checkbox B3 is checked. Therefore, the USB device 21 is connected (UPS-connected) to neither the projector 1 nor the PC 3. Meanwhile, of the checkboxes B1 to B3 for the USB device 22, the checkbox B1 is checked. Therefore, the USB device 22 is connected (USB-connected) to the PC 3.

The user can carry out an operation input to change a checked position among the checkboxes B1 to B3 and thus set each of the USB devices 21 and 22 connected to the projector 1 into one of the first state, the second state, and the third state.

For example, the user can carry out an operation input to operate the checkbox B1 corresponding to the icon I1 and thus set the USB device 21 connected to the projector 1 into the first state.

The operation input to operate the checkbox B1 corresponding to the icon I1 is an example of an operation input to the effect that a first device is connected to an external apparatus.

Back to FIG. 2, the operation detection unit 13 detects an operation input on the operation screen A. For example, the operation detection unit 13 has an image pickup unit (not illustrated) which picks up an image of the projection surface SC and generates a picked-up image. The operation detection unit 13 detects an operation input on the operation screen A, based on the picked-up image generated by the image pickup unit.

The storage unit 14 is a computer-readable recording medium. The storage unit 14 is, for example, a flash memory. However, the storage unit 14 is not limited to a flash memory and can be changed where appropriate. The storage unit 14 stores, for example, a program executed by the processing unit 15.

The processing unit 15 is, for example, a computer such as a CPU (central processing unit). The processing unit 15 may be made up of one or a plurality of processors. The processing unit 15 reads and executes a program stored in the storage unit 14 and thus implements a P2P connection unit 151, an image communication execution unit 152, an image processing unit 153, a USB hub 154, a hub control unit 155, a USB communication control unit 156, an operation control unit 157 functioning as a host controller of USB, and a web application server 158. The USB hub 154 and the hub control unit 155 are included in a USB hub virtualization unit 159.

The P2P connection unit 151 connects to the PC 3 via P2P, using the wireless communication unit 11. The image communication execution unit 152 executes communication of image information G with the PC 3 in conformity with the Miracast standard via the P2P connection unit 151 and the wireless communication unit 11. To simplify the following description of the communication via the P2P connection unit 151 and the wireless communication unit 11, the description about the P2P connection unit 151 and the wireless communication unit 11 is omitted. The image processing unit 153 executes image processing of the image information G received by the image communication execution unit 152 and thus generates an image signal. For example, the image processing unit 153 generates the connection setting image A3 as an OSD image and generates an image signal representing the operation screen A where the connection setting image A3 is superimposed on the image represented by the image information G.

The USB hub 154 is an example of an interface. The USB devices 21 and 22 can be connected to the USB hub 154.

The hub control unit 155 is an example of a control unit.

The hub control unit 155 has a plug and play control function and a connection state switching function.

First, the plug and play control function will be described.

The hub control unit 155 controls plug and play for the USB devices 21 and 22 connected to the USB hub 154. The hub control unit 155 controls plug and play for the USB devices 21 and 22, for example, when the projector 1 and the PC 3 are connected to each other, and when a connection instruction (for example, a first connection instruction) is accepted.

For the USB device 21, the hub control unit 155 does not cause PC 3 to execute plug and play accompanying the connection between the projector 1 and the PC 3. For the USB device 22, the hub control unit 155 causes the PC 3 to execute plug and play accompanying the connection between the projector 1 and the PC 3.

For example, according to the P2P connection between the PC 3 and the projector 1, the hub control unit 155 does not transmit first connection information (connection information that the USB device 21 is connected to the USB hub 154) to the PC 3 but transmits second connection information (connection information that the USB device 22 is connected to the USB hub 154) to the PC 3.

In this embodiment, the hub control unit 155 transmits the second connection information to the PC 3 via the USB communication control unit 156, the P2P connection unit 151, and the wireless communication unit 11.

To simplify the following description of the communication between the hub control unit 155 and the PC 3 via the USB communication control unit 156, the P2P connection unit 151, and the wireless communication unit 11, the description about using the USB communication control unit 156, the P2P connection unit 151, and the wireless communication unit 11 is omitted.

On receiving the second connection information, the PC 3 functions as a host controller of USB, executes plug and play for the USB device 22, and connects to the USB device 22.

Thus, the processing load of the PC 3 can be reduced, compared with the case where the PC 3 executes plug and play for the USB devices 21 and 22 when the projector 1 and the PC 3 are connected to each other.

If the hub control unit 155 receives a first connection instruction (connection instruction that the USB device 21 should be connected to the PC 3), the hub control unit 155 transmits the first connection information to the PC 3, causes the PC 3 to execute plug and play for the USB device 21, and connects the PC 3 and the USB device 21 to each other. Thus, in response to the first connection instruction, the PC 3 is enabled to execute plug and play for the USB device 21, for which plug and play is not executed when the projector 1 and the PC 3 are connected to each other. The hub control unit 155 receives the first connection instruction, for example, from the PC 3.

Also, in response to an operation input on the operation screen A detected by the operation detection unit 13, the hub control unit 155 causes the PC 3 to execute plug and play for the USB device 21, and connects the PC 3 and the USB device 21 to each other. For example, if the operation detection unit 13 detects an operation input to operate the checkbox B1 corresponding to the icon I1, the hub control unit 155 causes the PC 3 to execute plug and play for the USB device 21, and connects the PC 3 and the USB device 21 to each other.

Next, the connection state switching function will be described.

The connection state switching function is the function of setting the connection states of the USB devices 21 and 22 connected to the projector 1 (USB hub 154) to one of the first state (state of being connected to the PC 3), the second state (state of being connected to the projector 1), and the third state (state of being connected to neither the PC 3 nor the projector 1).

The hub control unit 155 sets the connection state of each of the USB devices 21 and 22 to one of the first state, the second state, and the third state, for example, in response to an operation input on the connection setting image A3 (see FIG. 4).

For example, if the operation detection unit 13 detects an operation input to operate the checkbox B1 corresponding to the icon I1, that is, to set the connection state of the USB device 21 to the first state, the hub control unit 155 operates as follows.

To set the connection state of the USB device 21 to the first state, the hub control unit 155 transmits to the PC 3 first connection information (connection information indicating that the USB device 21 is connected to the USB hub 154) as a response to an inquiry about the state of the USB hub 154 (hereinafter referred to as "state inquiry") from the PC 3 (host controller of USB). Based on this response, the PC 3 executes plug and play to connect the USB device 21 to the PC 3.

In this circumstance, in response to a state inquiry from the operation control unit 157 in the projector 1, the hub control unit 155 outputs to the operation control unit 157 third connection information indicating that the USB device 21 is not connected to the USB hub 154. Therefore, the operation control unit 157 does not execute plug and play to connect the USB device 21 to the projector 1. The third connection information outputted from the hub control unit 155 may be information that the connection of the USB device 21 to the USB hub 154 is canceled.

Meanwhile, for example, if the operation detection unit 13 detects an operation input to operate the checkbox B2 corresponding to the icon I1, that is, to set the connection state of the USB device 21 to the second state, the hub control unit 155 operates as follows.

To set the connection state of the USB device 21 to the second state, the hub control unit 155 outputs the first connection information to the operation control unit 157, as a response to a state inquiry from the operation control unit 157. Based on this response, the operation control unit 157 executes plug and play to connect the USB device 21 to the projector 1.

In this circumstance, the hub control unit 155 outputs the third connection information to the PC 3 in response to a state inquiry from the PC 3. Therefore, the PC 3 does not execute plug and play to connect the USB device 21 to the PC 3.

Also, for example, if the operation detection unit 13 detects an operation input to operate the checkbox B3 corresponding to the icon I1, that is, to set the connection state of the USB device 21 to the third state, the hub control unit 155 operates as follows.

To set the connection state of the USB device 21 to the third state, the hub control unit 155 outputs the third connection information as a response to a state inquiry from each of the operation control unit 157 and the PC 3. Therefore, neither the PC 3 nor the operation control unit 157 executes plug and play for the USB device 21.

The USB communication control unit 156 controls the communication between the USB devices 21 and 22 and the PC 3 via the USB hub 154 and the hub control unit 155. The USB communication control unit 156 has a UoIP function.

As described above, the UoIP function includes the function of encapsulating transmission information outputted from each of the USB devices 21 and 22 into an IP packet, thus generating a transmission packet, and transmitting the transmission packet to the PC 3, and the function of decapsulating an IP packet received from the PC 3, thus generating reception information, and outputting the reception information to the USB devices.

The USB communication control unit 156 receives transmission information outputted from each of the USB devices 21 and 22 via the USB hub 154 and the hub control unit 155. The USB communication control unit 156 also outputs reception information to the USB devices via the USB hub 154 and the hub control unit 155.

The USB communication control unit 156 starts controlling, for example, the communication between the USB device 22 and the PC 3 in response to the wireless communication unit 11 and the PC 3.

The USB communication control unit 156 controls communication using the UoIP function while the image communication execution unit 152 is executing communication of the image information G. For example, the USB communication control unit 156 executes packet communication using the UoIP function while the image communication execution unit 152 is executing packet communication of the image information G.

The web application server 158 is accessed, for example, when the icon I3 in the device folder A2 shown in FIG. 4 is operated in the PC 3.

The web application server 158 provides a web screen for setting the connection states of the USB devices 21 and 22 connected to the USB hub 154 to one of the first state, the second state, and the third state, to a device or unit accessing the web application server 158.

Figure 5:
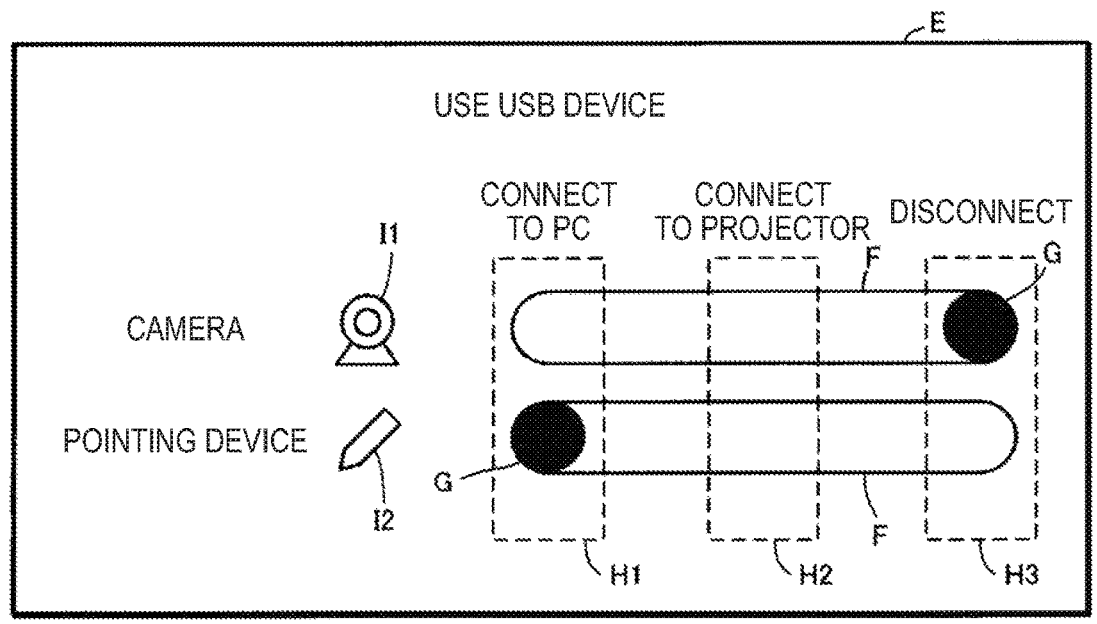
FIG. 5 shows an example of a web screen E.

FIG. 5 shows an example of a web screen (web image) E.

The web screen E has a guide section F and a button G for each of the icons I1 and I2. The user of the PC 3 set the position of the button G within the guide section F to within one of an area H1 corresponding to the first state, an area H2 corresponding to the second state, and an area H3 corresponding to the third state, for example, using an operation unit 33, described later.

The web application server 158 outputs to the hub control unit 155 a connection instruction for the USB devices 21 and 22 corresponding to the position of the button G on the web screen E. According to this connection instruction, the hub control unit 155 sets the connection states of the USB devices 21 and 22.

The USB hub virtualization unit 159 is used to connect the PC 3 and the USB devices 21 and 22.

The PC 3 includes a display unit 31, a speaker 32, an operation unit 33, a wireless communication unit 34, a storage unit 35, and a processing unit 36.

The display unit 31 displays various kinds of information. The speaker 32 outputs various sounds. The operation unit 33 is, for example, a keyboard and accepts an operation by the user. The wireless communication unit 34 wirelessly communicates, for example, with the projector 1.

The storage unit 35 is a computer-readable recording medium. The storage unit 35 is, for example, a hard disk. However, the storage unit 35 is not limited to a hard disk and can be changed where appropriate. The storage unit 35 stores, for example, a program executed by the processing unit 36, and the image information G.

The processing unit 36 is, for example, a computer such as a CPU. The processing unit 36 may be made up of one or a plurality of processors. The processing unit 36 reads and executes a program stored in the storage unit 35 and thus implements a P2P connection unit 361, an image communication execution unit 362, a USB communication control unit 363, and art operation control unit 364 functioning as a host controller of USB.

The P2P connection unit 361 connects to the projector 1 via P2P, using the wireless communication unit 34. The image communication execution unit 362 executes communication of the image information G with the projector 1 in conformity with the Miracast standard.

For example, the image communication execution unit 362 reads out the image information G from the storage unit 35 and transmits the image information G to the projector 1 via the P2P connection unit 361 and the wireless communication unit 34. The image communication execution unit 362 may also transmit the image information G that is not stored in the storage unit 35 (for example, image information generated by the processing unit 36) to the projector 1 via the P2P connection unit 361 and the wireless communication unit 34. To simplify the following description of the communication via the P2P connection unit 361 and the wireless communication unit 34, the description about the P2P connection unit 361 and the wireless communication unit 34 is omitted.

The USB communication control unit 363 includes the function of encapsulating transmission information for USB outputted from the operation control unit 364 into an IP packet, thus generating a transmission packet, and transmitting the transmission packet to the projector 1, and the function of decapsulating an IP packet received from the projector 1, thus generating reception information, and outputting the reception information to the operation control unit 364. That is, the USB communication control unit 363 has a UoIP function similar to that of the USB communication control unit 156.

The USB communication control unit 363 executes packet communication using the UoIP function while the image communication execution unit 362 is executing packet communication of the image information G.

The operation control unit 364 functions as a host controller of USB and has a driver for the pointing device of a USB device.

Operations will be described next.

Figure 6:
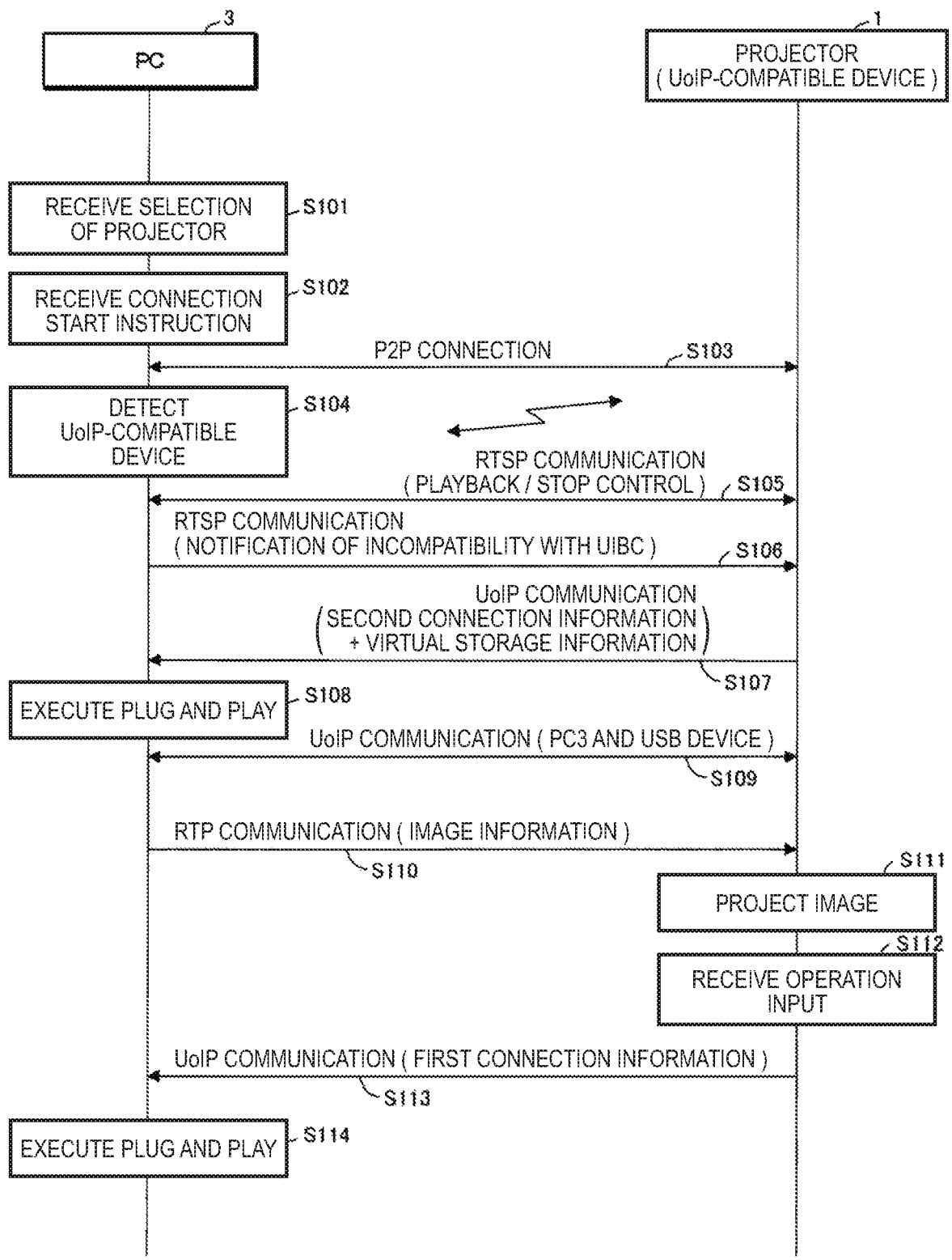
FIG. 6 is a sequence chart for explaining an example of operations.

FIG. 6 is a sequence chart for explaining an example of operations between the projector 1 and the PC 3.

First, in the projector 1, an operation unit, not illustrated, is operated to enable the USB hub virtualization unit 159. This enabling means, for example, that the functions of the hub control unit 155 are turned on. If the functions of the hub control unit 155 are turned on when the power of the projector 1 is switched on, the processing to enable the USB hub virtualization unit 159 is omitted.

The PC 3 searches for a receiving device that can be connected to the PC 3 via P2P (hereinafter also referred to as "Miracast receiving device), and displays the Miracast receiving device thus found, on the display unit 31. The user of the PC 3 operates the operation unit 33 to select the projector 1 from among the Miracast receiving devices displayed on the display unit 31. The P2P connection unit 361 receives the selection of the projector 1 (step S101).

Next, the user of the PC 3 operates the operation unit 33 to input to the PC 3 a connection start instruction designating the start of connection with the projector 1. The P2P connection unit 361 receives the connection start instruction (step S102) and starts authentication processing for P2P connection with the projector. When the authentication of the projector 1 is successful, the P2P connection unit 361 connects to the P2P connection unit 151 via P2P (step S103).

Next, the P2P connection unit 361 outputs a connection completion notification that the P2P connection is completed, to the image communication execution unit 362 and the USB communication control unit 363.

On receiving the connection completion notification, the USB communication control unit 363 starts detecting a device that can execute UoIP (hereinafter also referred to as "UoIP-compatible device) (step S104).

In step S104, the USB communication control unit 363 detects a UoIP-compatible device, for example, using IP multicast. As an example, the USB communication control unit 363 transmits, by IP multicast, compatibility confirmation information that a UoIP-compatible device needs to respond. The USB communication control unit 363 then detects a UoIP-compatible device, based on the response.

Next, the USB communication control unit 363 determines whether the projector 1 connected via P2P is a UoIP-compatible device or not, based on the result of the detection of a UoIP-compatible device. The USB communication control unit 363 outputs the result of the determination to the image communication execution unit 362.

Meanwhile, the image communication execution unit 362, on receiving the connection completion notification, carries out RTSP communication with the image communication execution unit 152 of the projector 1 and decides settings (for example, playback start, playback stop, route, and resolution) about the transmission of the image information G (step S105).

Also, on receiving the result of the determination that the projector 1 is a UoIP-compatible device from the USB communication control unit 363, the image communication execution unit 362 transmits to the projector 1 incompatibility information that the PC 3 is incompatible with UIBC, in order to stop communication via UIBC (user input hack channel) (step S106).

UIBC is a standard for notifying an apparatus connected with the projector 1 in conformity with the Miracast standard, of the coordinates of the pointing device built in the projector 1.

Transmitting the incompatibility information in step S106 makes it possible to avoid communicating the same information in the communication via UIBC and in the communication via UoIP. If the incompatibility information is received, the image communication execution unit 152 of the projector does not execute the communication via UIBC.

If the image communication execution unit 362 receives the result of the determination that the projector 1 is not a UoIP-compatible device from the USB communication control unit 363, the image communication execution unit 362 does not execute the transmission of the incompatibility information because there is no need to stop the communication via UIBC.

Meanwhile, after transmitting a response to the compatibility confirmation information, the hub control unit 155 of the projector 1 does not transmit the first connection information to the PC 3 but transmits the second connection information to the PC 3 via the USB communication control unit 156 and the P2P connection unit 151 (step S107).

In this embodiment, in step S107, the hub control unit 155 also transmits virtual storage information about a virtual storage which stores information of the USB device 21 and information of the USB device 22 to the PC 3 via the USB communication control unit 156 and the P2P connection unit 151.

The information of the USB device 21 stored in the virtual storage is, for example, information representing the USB device class of the USB device 21. This information of the USB device 21 is an example of first device information about a first device.

The information of the USB device 22 stored in the virtual storage is, for example, information representing the USB device class of the USB device 22. This information of the USB device 22 is an example of second device information about a second device.

In step S107, the USB communication control unit 156 encapsulates the second connection information and the virtual storage information into an IP packet, thus generates a transmission packet, and transmits the generated transmission packet to the PC 3.

On receiving the second connection information via the USB communication control unit 363 or the like, the operation control unit 364 of the PC 3 executes plug and play for the USB device 22 and connects to the USB device 22 (step S108).

The operation control unit 364 has a driver for the pointing device of a USB device. Therefore, in plug and play for the USB device 22, the operation control unit 364 need not carry out processing to newly acquire a driver for the USB device 22. Thus, increase in the processing load of plug and play by the PC 3 can be restrained when the PC 3 and the projector 1 are connected to each other.

On connecting to the USB device 22, the operation control unit 364 starts communicating with the USB device 22 (step S109). In this communication, the USB communication control unit 363 of the PC 3 and the USB communication control unit 156 of the projector 1 control the communication between the operation control unit 364 and the USB device 22, using UoIP.

The operation control unit 364 displays the virtual storage folder A1 shown in FIG. 4 on the display unit 31, using the virtual storage information.

As the plug and play in step S108 is completed, the image communication execution unit 362 starts transmitting the image information G to the projector 1 (step S110). The image communication execution unit 152 of the projector 1 outputs the image information G transmitted from the PC 3 to the image processing unit 153.

The image processing unit 153 carries out image processing of the image information G and thus generates an image signal.

For example, the image processing unit 153 generates an image signal in which the connection setting image A3 (see FIG. 4) is superimposed on the image represented by the image information G.

As an example, if the image represented by the image information G is an image showing the parts of the operation screen A (see FIG. 4) except the connection setting image A3, the image processing unit 153 generates an image signal representing the operation screen A shown in FIG. 4.

The projection unit 12 projects and displays an image corresponding to the image signal generated by the image processing unit 153, onto the projection surface SC (step S111).

Subsequently, for example, if the user touches the checkbox B1 of the icon I1 with a hand in the state where the connection setting image A3 is displayed on the projection screen SC, the operation detection unit 13 receives an operation input to the checkbox B1 (step S112).

In response to the operation input to the checkbox B1 detected by the operation detection unit 13, the hub control unit 155 transmits the first connection information to the PC 3 via the USB communication control unit 156 and the P2P connection unit 151 (step S113). In step S113, the USB communication control unit 156 encapsulates the first connection information into an IP packet, thus generates a transmission packet, and transmits the generated transmission packet to the PC 3.

The operation control unit 364 of the PC 3 receives the first connection information via the USB communication control unit 363 or the like, then executes plug and play for the USB device 21, and connects to the USB device 21 (step S114).

With the electronic apparatus and the method for controlling the electronic apparatus according to this embodiment, the PC 3 does not execute plug and play accompanying the connection between the projector 1 and the PC for the USB device 21 of the devices connected to the projector 1. This can restrain increase in the processing load of the PC 3 when the USB devices are connected to the projector 1 and the projector 1 is connected to the PC 3.

Also, with the electronic apparatus and the method for controlling the electronic apparatus according to this embodiment, the USB devices connected to the projector 1 and the PC 3 can communicate with each other when the PC 3 and the projector 1 are communicating the image information G with each other.

Moreover, with the electronic apparatus and the method for controlling the electronic apparatus according to this embodiment, the devices connected to the USB hub 154 of the projector 1 can be set into one of the first state of being connected to the PC 3 connected to the projector 1, the second state of being connected to the projector 1, and the third state of being connected to neither the PC 3 nor the projector 1.

Thus, for example, if a USB microphone device is used as the USB device 22, the following use is conceivable.

In the PC 3, an application is constantly present for amplifying a sound picked up by the USB microphone device and outputting the amplified sound from the speaker 32 of the PC 3. This application operates with an application for presentation. The PC 3 is now assumed to be placed at the back of a conference room and away from a presenter. The projector 1 is assumed to be placed at the front of the conference room.

In such a circumstance, it is assumed that someone complains that the presenter's voice does not reach the back of the conference room.

Thus, the presenter operates the checkbox B1 of the USB microphone device (USB device 22) on the connection setting image A3 and thus connects the USB microphone device (USB device 22) to the PC 3. This makes it easier for the sound picked up by the USB microphone device to reach the back of the conference room.

However, if the volume from the speaker 32 of the PC 3 is low, the presenter operates the checkbox B2 of the USB microphone device on the connection setting image A3 and thus connects the USB microphone device to the projector 1, so as to use a speaker (not illustrated) of the projector 1 that can output a higher volume. This enables the sound from the projector 1 to reach the entire conference room.

To project the screen of the PC 3 from the projector 1 for discussions after the presentation, the presenter operates the checkbox B3 of the USB microphone device on the connection setting image A3, thus disconnects the USB microphone device, and maintains only the projection of the image.

Modifications

The invention is not limited to the foregoing embodiment. For example, the following modifications can be made. Also, one or a plurality of modifications arbitrarily selected from the following modifications can be combined where appropriate.

Modification 1

The electronic apparatus is not limited to the projector 1 and can be changed where appropriate. The external apparatus is not limited to the PC 3 and can be changed where appropriate. The number of USB devices connected to the projector 1 is not limited to two and may be one or any greater number. The USB device is not limited to the pointing device or camera device and can be changed where appropriate. For example, the USB device may be a document camera for showing an object on a desk in close-up, a storage device for storing an information file, a microphone device for amplifying the voice of a presenter present around the projector 1, or a keyboard device used to enter a password on the projector 1 side.

Modification 2

The specific type is not limited to the HID class and can be changed where appropriate. For example, MSC (Mass Storage Class) may be used as the specific type.

It is desirable that a USB device class corresponding to a standard driver installed in the PC, more specifically, in the OS (operating system) of the PC, is used. When such a USS device class is used as the specific type, the PC 3 no longer needs to acquire a driver corresponding to the USB device from outside at the time of plug and play. This can restrain increase in the processing load in plug and play.

Modification 3

In step S104 of detecting a UoIP-compatible device, the USB communication control unit 363 may detect a UPnP (Universal Plug and Play) apparatus compatible with SSDP (Simple Service Discovery Protocol), as a UoIP-compatible device. The UPnP apparatus is indicates by an icon (in FIG. 4, icon I3) in the device folder 2 shown in FIG. 4.

If a UPnP apparatus is used as a UoIP-compatible device, it is desirable that the URL (uniform resource locator) to the web application server 158 is used as the URL of an image displayed by a click on the icon I3. In this case, a click on the icon I3 displays the web screen E shown in FIG. 5.

If the position of the button G is changed on the web screen E, the web application server 158 outputs, to the hub control unit 155, the connection states of the USB devices 21 and 22 specified by the position of the button G on the web screen E, using a connection instruction representing the connection states. In response to the connection instruction, the hub control unit 155 sets the connection states of the USB devices 21 and 22. The URL of the image displayed by a click on the icon I3 is also referred to as presentation URL.

If a UPnP apparatus is used as a UoIP-compatible device, the device folder A2 can also be displayed on an apparatus other than the PC 3, of the apparatuses belonging to the network to which the projector 1 belongs.

A click on the icon I3 in such an apparatus (hereinafter referred to as "specific apparatus") causes the web application server 158 to present the web screen E to the specific apparatus. If the position of the button G on the web screen E is changed in the specific apparatus, the web application server 158 outputs, to the hub control unit 155, the connection states of the USB devices 21 and 22 specified by the position of the button G on the web screen E, using a connection instruction representing the connection states.

That is, not only the PC 3 connected to the projector 1 but also other apparatuses (devices) belonging to the same network can access the web application server 158.

Thus, the icon I3 functions as a link to the entrance to remotely change the connection destination of the USB devices connected to the projector 1. For example, a facilitator who assists the presenter clicks on the icon I3 at a different PC from the PC 3. This can change the connection destination of the USB devices connected to the projector 1.

Modification 4

In response to a click on the icon I1 shown in the virtual storage folder A1 (see FIG. 4), the connection state of the USB device 21 may cyclically change to the first state, the second state, the third state, the first state, and so on. In response to a click on the icon I2 shown in the virtual storage folder A1, the connection state of the USS device 22 may cyclically change to the first state, the second state, the third state, the first state, and so on.

In this case, for example, the icons I1 and I2 in the virtual storage folder A1 are regarded as link files. A WebAPI (web application programming interface) linked with these link files is provided in the processing unit 15 (for example, web application server 158) of the projector 1.

For example, a click on the icon I2 in the virtual storage folder A1 causes the PC 3 to issue a HTTP (Hypertext Transfer Protocol) access to the projector 1. The WebAPI outputs, to the hub control unit 155, a correction instruction to cyclically change the connection state of the USB device 22 to the first state, the second state, the third state, the first state, and so on, every time this access is issued. In response to the connection instruction, the hub control unit 155 sets the connection states of the USB devices 21 and 22.

Entries to the WebAPI are set in such a way as to enable REST-like WebAPI control for each function of the USB devices.

For example, if the USB device 21 is connected to a USB port number "1" of the USB hub 154 and has a vendor ID of 1234, a product ID of 5678, and a function "1", and the projector has an IP address of 192.168.1.1, the link of the icon I1 of the USB device 21 is defined as the following shortcut: a shortcut made up of the IP address (192.168.1.1) with the USB port number "1", the vendor ID of 1345, the product ID of 5678, and the function "1" added thereto.

It is desirable that the hub control unit 155 dynamically generates and deletes the links of the icons in the virtual storage folder A1 according to the insertion and removal of the USB devices into and from the projector 1.

A notification of success or failure in changing the connection states of the USB devices using the WebAPI may include not only a status code reply as the WebAPI but also JavaScript (registered trademark) displaying the status in the form of a popup.

As a technique for associating entries to the WebAPI to the USB devices connected to the USB hub 154, serial numbers given to the USB devices in the order in which the projector 1 discovers the USB devices may be used, instead of the physical port numbers of the USB hub 154 to which the USB devices are connected. However, the relation between the serial numbers and the USB devices can change every time the projector 2 starts up. Therefore, it is desirable that, as entries to the WebAPI, a univocal URL for each USB device is issued, based on the physical USB port as described above.

It is desirable that icons showing the USB device class are used as the icons of the link files. Here, it is desirable that the icons showing the USB device class correspond to a device class prescribed http://www.usb.org/developers/defined_class, regardless of whether the projector 1 and the PC 3 correspond to the USB device class or not.

Modification 5

If the USB device 21 as a microphone device is connected to the PC 3 via the projector 1, information of a sound collected by the microphone device and sent to the PC 3 may be sent back to the projector 1 by an audio output function conforming to the Miracast standard. In this case, the sound outputted from the projector 1 is outputted later than the original sound and can be difficult for the user to hear.

Thus, the operation control unit 157 may switch off the audio output function conforming to the Miracast standard when the microphone device is on.

Modification 6

If a USB device belonging to an unknown USB device class is connected to the projector 1, the hub control unit 155 may allocate an arbitrary icon selected from a preset group DSP device class icons, to the connected USB device.

In this case, the hub control unit 155 stores, in the storage unit 14, icon information representing the icon allocated to this USB device in association with the vender ID and product ID of the USB device. The next time this USB device is used, the hub control unit 155 may automatically use the icon selected in the past, referring to the icon information stored in the storage unit 14.

Modification 7

The technique for restraining the processing load of the PC 3 caused by plug and play corresponding to the connection between the projector 1 and the PC 3 with respect to a USB device that is not the specific type is not limited to the technique of using the first connection information and the second connection information or the like.

For example, the hub control unit 155 may disguise a DSP device that is not the specific type, as a USB device of the specific type (for example, HID class), and notify the PC 3 of this USB device. In this case, the PC 3 can be restrained from acquiring a driver for a USB device that is not the specific type, in response to this notification.

When the projector 1 and the PC 3 are connected to each other, the hub control unit 155 may turn off the supply of electricity to a USB device that is not the specific type on the USB hub 154, and thus may restrain plug and play for the USB device that is not the specific type.

The hub control unit 155 may selectively use the following techniques, for example, by using the technique of turning off the supply of electricity to the USB device that is not the specific type when restraining power consumption, and using the technique of disguising the USB device when not controlling the supply of electricity to the UBS device.

Modification 8

In the foregoing embodiment, the hub control unit 155 sets each of the USB devices 21 and 22 into one of the first state of being connected to the PC 3, the second state of being connected to the projector 1, and the third state of being connected to neither the PC 3 nor the projector 1.

However, a USB device incompatible with the projector 1 need not be connected to the projector 1. Therefore, the hub control unit 155 may set the USB device incompatible with the projector 1 into one of the first state and the third state.

If the connection state of the USB device is to be set to one of the first state and the third state, for example, the checkbox B2 may be omitted from the connection setting image A3, and the area H2 may be omitted from the web screen E.

Also, if the connection state of the USB device is to be set to one of the first state and the third state, the checkboxes B1 to B3 may be omitted from the connection setting image A3, and the color of the icon may be made different between the first state and the third state (for example, grayout for the third state and a distinct color for the first state).

If no USB device is to be connected to the projector 1, the hub control unit 155 may set any USB device into one of the first state and the third state.

Modification 9

The projection unit 12 uses liquid crystal light valves as a light modulation device. However, the light modulation device is not limited to the liquid crystal light valves and can be changed where appropriate. For example, the light modulation device may use three reflection-type liquid crystal panels. The light modulation device may also employ a method using one liquid crystal panel, a method using three digital mirror devices (DMDs), or a method using one digital mirror device, or the like. If only one liquid crystal panel or DMD is used as the light modulation device, components equivalent to the color separation system and the light combining system are not necessary. Also, any configuration that can modulate light emitted from the light source, other than the liquid crystal panel and DMD, can be employed as the light modulation device.

Modification 10

While the projection unit 12 is used as a display unit, the display unit is not limited to the projection unit 12 and can be changed where appropriate. For example, the display unit may be a direct-view display.

Modification 11

All or a part of the plurality of functional units shown in FIG. 2 may be implemented, for example, by hardware such as an electronic circuit like FPGA (field programmable gate array) or ASIC (application specific IC).

The entire disclose of Japanese Patent Application No. 2017-183295, filed Sep. 25, 2017 is expressly incorporated by reference herein.

What is claimed is:

1. An electronic apparatus connectable with an external apparatus, the electronic apparatus comprising:
a processor programmed to connect to a plurality of devices and control plug and play for a device connected to the processor,
wherein the processor
does not cause the external apparatus to execute plug and play accompanying the connection between the electronic apparatus and the external apparatus when a first device is connected to the processor, the first device being not a specific type, and
causes the external apparatus to execute plug and play accompanying the connection between the electronic apparatus and the external apparatus when a second device is connected to the processor, the second device being the specific type, wherein
the processor is further programmed to
in response to the first device being connected to the electronic apparatus and not being the specific type, transmit to the external apparatus third connection information indicating the first device is not connected to the electronic apparatus and thereby prevent the external apparatus from executing plug and play with the first device,
in response to the second device being connected to the electronic apparatus and being the specific type, transmit to the external apparatus first connection information indicating the second device is connected to the electronic apparatus and thereby cause the external apparatus to execute plug and play with the second device,
transmit to the external apparatus the first connection information indicating the first device is connected to the electronic apparatus and thereby cause the external apparatus to execute plug and play with the first device in response to the processor receiving a connection instruction, which designates connection with the first device, from the external apparatus,
set the first device into (i) a first state of being connected to the external apparatus, (ii) a second state of being connected to the electronic apparatus, or (iii) a third state of being connected to neither the external apparatus nor the electronic apparatus, and
transmit the third connection information to the external apparatus when setting the first device to the second state and transmit the first connection information to the external apparatus when setting the first device to the first state.

2. The electronic apparatus according to claim 1, wherein the processor transmits first device information about the first device to the external apparatus according to the connection between the electronic apparatus and the external apparatus.

3. The electronic apparatus according to claim 2, wherein the processor transmits virtual storage information about a virtual storage which stores the first device information, to the external apparatus according to the connection between the electronic apparatus and the external apparatus.

4. The electronic apparatus according to claim 1, wherein the processor causes the external apparatus to execute plug and play for the first device if the processor receives a connection instruction which designates connection with the first device, from the external apparatus.

5. The electronic apparatus according to claim 1, further comprising a light source which displays, on a display surface, an operation screen where an operation input is made to the effect that the first device is connected to the external apparatus,
wherein the processor causes the external apparatus to execute plug and play for the first device according to the operation input on the operation screen.

6. The electronic apparatus according to claim 1, wherein the second device is a pointing device.

7. An electronic apparatus connectable with an external apparatus, the electronic apparatus comprising:
a processor programmed to connect to a device and control plug and play for the device connected to the processor,
wherein the processor
does not cause the external apparatus to execute plug and play accompanying the connection between the electronic apparatus and the external apparatus when a first device is connected to the processor, the first device being not a specific type, and
causes the external apparatus to execute plug and play for the first device when the processor receives a connection instruction which designates connection with the first device, from the external apparatus, wherein
the processor is further programmed to
in response to the first device being connected to the electronic apparatus and not being the specific type, transmit to the external apparatus third connection information indicating the first device is not connected to the electronic apparatus and thereby prevent the external apparatus from executing plug and play with the first device,
transmit to the external apparatus first connection information indicating the first device is connected to the electronic apparatus and thereby cause the external apparatus to execute plug and play with the first device in response to the processor receiving the connection instruction from the external apparatus,
set the first device into (i) a first state of being connected to the external apparatus, (ii) a second state of being connected to the electronic apparatus, or (iii) a third state of being connected to neither the external apparatus nor the electronic apparatus, and
transmit the third connection information to the external apparatus when setting the first device to the second state and transmits the first connection information to the external apparatus when setting the first device to the first state.

8. A method for controlling an electronic apparatus connectable with an external apparatus and including a processor programmed to connect to a plurality of devices, the method comprising:
not causing the external apparatus to execute plug and play accompanying the connection between the electronic apparatus and the external apparatus when a first device is connected to the processor, the first device being not a specific type;
causing the external apparatus to execute plug and play accompanying the connection between the electronic apparatus and the external apparatus when a second device is connected to the processor, the second device being the specific type;

in response to the first device being connected to the electronic apparatus and not being the specific type, transmitting to the external apparatus third connection information indicating the first device is not connected to the electronic apparatus and thereby preventing the external apparatus from executing plug and play with the first device;

in response to the second device being connected to the electronic apparatus and being the specific type, transmitting to the external apparatus first connection information indicating the second device is connected to the electronic apparatus and thereby causing the external apparatus to execute plug and play with the second device;

transmitting to the external apparatus the first connection information indicating the first device is connected to the electronic apparatus and thereby cause the external apparatus to execute plug and play with the first device in response to the processor receiving a connection instruction, which designates connection with the first device, from the external apparatus;

setting the first device into (i) a first state of being connected to the external apparatus, (ii) a second state of being connected to the electronic apparatus, or (iii) a third state of being connected to neither the external apparatus nor the electronic apparatus; and transmitting the third connection information to the external apparatus when setting the first device to the second state and transmitting the first connection information to the external apparatus when setting the first device to the first state.

* * * * *